United States Patent Office 2,891,926
Patented June 23, 1959

2,891,926

PROCESS FOR PROMOTING THE LOW-HYSTERESIS PROCESSING OF RUBBER AND CARBON BLACK USING AN ARYL POLYHALOGENOMETHANE

Kenneth W. Doak, Bloomfield, N.J., assignor to United States Rubber Company, New York, N.Y., a corporation of New Jersey No Drawing. Application February 3, 1954
Serial No. 408,027

12 Claims. (Cl. 260—41.5)

This invention relates to improvements in the technique of processing highly loaded carbon black and rubber mixes prior to vulcanization thereof, and more particularly to improvements in so-called "low-hysteresis" processing of carbon black and rubber mixes.

The technique of processing highly loaded carbon black and rubber mixes prior to vulcanization thereof, whereby to obtain vulcanizates with improvements in physical and chemical properties, is described in Gerke et al., U.S. Patent 2,118,601. The improved vulcanizates prepared by the technique of Gerke et al. differ from the usual vulcanizates produced by older techniques in that they have relatively (1) lower modulus at low elongation, (2) higher modulus above 300% elongation, (3) higher resistance to abrasion, (4) lower torsional hysteresis, and (5) higher electrical resistivity, and are (6) relatively softer.

These improved vulcanizates are obtained, in accordance with the Gerke et al. technique, by incorporating in the rubber a relatively large amount of carbon black, for example, at least 25 parts, and preferably in the case of tire treads, at least 40 parts by weight of carbon black per 100 parts by weight of rubber, and then subjecting a substantially homogeneous mixture of the ingredients to a heat treatment at a temperature substantially above 250° F., the preferred temperature being in the range from about 300° F. to 370° F., and masticating the mix during and/or after such heat treatment, or alternately therewith. The duration of the special heat treatment may vary with the temperature employed, the higher the temperature the shorter the time, and is governed also by the degree of change desired in the properties of the ultimate vulcanized product, which properties are gauged to be compatible with its final use. In general, heat treatments of from 10 to 60 minutes' duration will be found suitable for most purposes, and particularly within the preferred temperature range.

An object of the present invention is to provide new chemical promoters for the processing of rubber and carbon black mixes as described in U.S. Patent 2,118,601 whereby to obtain high electrical resistance and low torsional hysteresis of tread stocks. A further object is to provide substantial decreases in the time of the low-hysteresis processing by the use of the herein disclosed chemicals with consequent increase in the capacity and output of equipment. Other objects will appear more fully hereinafter.

I have found that certain aryl polyhalogenomethanes substantially decrease the time and/or lower the temperature necessary for low-hysteresis processing of rubber and carbon black mixes. The compounds used as promoters in my invention have one of the general formulas, $RCX_nY_{3-n}$ ($n$ is an integer from 0–3, X is chlorine, Y is bromine) and $RCHBr_2$ where R is selected from phenyl, 2-pyridyl, and phenyl, naphthyl, and 2-pyridyl having at least one substituent selected from halogen, nitro, carboxyl, and carbalkoxy. Specific examples of operative promoters are benzotrichloride, o-, m-, and p-chlorobenzotrichlorides, 2,4-dichlorobenzotrichloride, 3,4-dichlorobenzotrichloride, benzotribromide, benzal bromide, p-bromobenzal bromide, m-fluorobenzal bromide, 2,4,6-trichlorobenzotrichloride, p-nitrobenzal bromide, 2-trichloromethyl pyridine, 5-chloro-2-trichloromethyl pyridine, 3,5-dichloro-2-trichloromethyl pyridine, 6-trichloromethyl picolinic acid, methyl-6-trichloromethyl picolinate, benzochloride dibromide, benzodichloride bromide, and 1-chloro-2-trichloromethylnaphthalene. Aryl polyhalogenomethanes which contain only one bromine or one or two chlorine atoms (and no other halogen) on the methyl group to which aryl is attached are not sufficiently effective in low-hysteresis processing to warrant their use. I prefer to use the trichloromethyl compounds, especially those in which the trichloromethyl group is attached to a phenyl or chlorinated phenyl group.

These promoters are effective in natural rubber, synthetic rubbery homopolymers of aliphatic conjugated diolefin hydrocarbons, especially butadiene and isoprene, and synthetic rubbery copolymers of such diolefin hydrocarbons with copolymerizable monoolefinic compounds such as isobutylene, styrene, alpha-methyl styrene, ethyl acrylate, acrylonitrile, methyl methacrylate, methyl acrylate, methyl vinyl ketone, methyl isopropenyl ketone, isobutylene, and mono-vinyl pyridines. As a class, they are very effective in natural rubber, e.g., in Hevea rubber, and in blends of natural rubber with the butadiene-styrene copolymers known as GR–S especially blends of Hevea rubber and GR–S containing at least 25% of Hevea, this being particularly true of the above-mentioned trichloromethyl compounds. They can be used in Butyl rubber which, as is well-known, is a copolymer of a major proportion, typically from 90 to 99.5%, of isobutylene and a minor proportion, typically correspondingly from 10 to 0.5%, of an aliphatic conjugated diolefin hydrocarbon, especially butadiene or isoprene. The effectiveness of a given promoter chemical varies with the rubber used. Thus p-nitrobenzal bromide is highly effective in Butyl rubber.

The process of my invention comprises mixing natural rubber or a synthetic rubbery polymer of an aliphatic conjugated diolefin, i.e., an aliphatic conjugated diolefin homopolymer or copolymer, with a relatively large amount of a rubber-reinforcing carbon black and a relatively small but effective amount, i.e., from 1 to 4 parts per 100 parts of rubbery material, of an aryl polyhalogenomethane of the type described above, heating this mixture at a temperature above 275° F. but below that at which the rubber would be injured, and masticating the mixture during or following the heat treatment. This process brings about the desired changes in the rubber-carbon black mixture whereby a vulcanizate of the resulting mixture will have a considerably reduced torsional hysteresis and a considerably increased electrical resistivity. The heat treatment is carried out in the absence of vulcanizing materials, e.g., sulfur or sulfur-yielding compounds. Following the heat treatment, the vulcanizing and other desired compounding ingredients, including conventional accelerators and the like, are intimately incorporated in the conventional manner, after which the mixture is shaped and vulcanized in the usual way.

Any carbon black which is capable of reinforcing the rubber can be used in the practice of my invention. I usually use either a furnace black or a channel black. Those skilled in the art will appreciate that the type of black is often selected with reference to the particular rubber employed. The amount of carbon black present during the heat treatment should be equal to at least 25 parts per 100 parts by weight of rubber. Preferably the amount of carbon black is equal to at least 40 parts per 100 parts of rubber, the use of such high proportions of carbon black being particularly desirable in the case of tread stocks. The amount of carbon black present during the heat treatment can be as great as 100 parts per 100 parts of rubber.

In the preferred practice of my invention, the heat treatment of the mixture of rubber, carbon black and aryl polyhalogenomethane is carried out by mastication at temperatures above 275° F. but not over 400° F., and more preferably in the range of 300–375° F., with any suitable type of masticating equipment such as an open two-roll rubber mill or, more preferably, an internal rubber mixer, especially a Banbury mixer. The Banbury mixer is particularly advantageous because it exerts a severe masticatory action upon the charge and because it conserves the heat generated by the mixing action and this heat greatly aids in elevation of the stock temperature to within the desired range. Depending upon the size and operating speed of the Banbury mixer, and other factors, extraneous heat may or may not need to be applied to bring the stock temperature within the desired temperature range and to hold it there. If desired, extraneous cooling may be applied to keep the temperature from rising above the desired level.

The optimum duration of the heat treatment will vary depending upon many factors, including the temperature of heat treatment, type of heat treatment, i.e., whether it is static or dynamic, type of equipment used, e.g., in the case of masticatory heat treatment whether an open rubber mill or a Banbury or other type of internal mixer is used, amount of aryl polyhalogenomethane used, etc. In any event, the treating time will be considerably shorter at given temperature conditions, than the time required when the aryl polyhalogenomethane is omitted. In the case of the preferred masticatory treatment, times of the order of 5 to 30 minutes will generally be adequate for the purposes of my invention, the longer times being used at the lower temperatures and vice versa. It is well known that different rubbers vary as to the highest temperatures they can withstand without harm and the time and temperature should of course be so regulated as to not impair the properties of the final vulcanizate. It is preferable to form an intimate mixture of the rubber, carbon black and aryl polyhalogenomethane at a relatively low temperature, i.e., below 275° F., in order to avoid premature reaction of the polyhalogenomethane whereby its promoting effect upon the low hysteresis processing would be seriously reduced.

To the best of my present knowledge, the most effective aryl polyhalogenomethane compounds of the type described above are those which contain three bromine or chlorine atoms on the methane carbon atom. In some cases, particularly in Hevea rubber, those chemicals which contain only two bromine atoms on the methane carbon atom may have a selective effect on the electrical resistivity or the torsional hysteresis of the final vulcanizate. Thus, as is shown by Stock 8 of Example 3 below, p-nitrobenzal bromide used with Hevea rubber has been found to effect a great increase in electrical resistivity but only a relatively small reduction in torsional hysteresis. The reason for this selective effect is not yet known.

The promoting effect of the aryl trichloromethanes is enhanced by having present during the heat treatment a small amount of certain metal oxides, namely, lead dioxide, red lead, zinc peroxide, or manganese dioxide. Of these, lead dioxide is particularly effective. The amount will usually be from 1 to 5 parts per 100 parts of the rubbery material. Litharge has virtually no effect, while zinc oxide actually retards the process materially.

The following examples illustrate the preferred method of practicing the invention. All parts are by weight.

EXAMPLE 1

A masterbatch is prepared by mixing together 100 parts of natural rubber, 50 parts of carbon black (a medium processing channel black known commercially as "Spheron–6") and 5 parts of stearic acid. This mixing operation is carried out in the conventional manner in a Banbury mixer. To 155 parts of this masterbatch 2.0 parts of benzotrichloride is added on a two-roll rubber mill at a temperature preferably below 275° F. The mill temperature is then raised to 300° F. and the mixture is masticated 10 minutes. Thereafter the mill is cooled to 150–200° F. and 2 parts of pine tar, 2 parts of zinc oxide, 1 part of antioxidant, 1 part of accelerator, and 2.6 parts of sulfur are incorporated. The mixture is placed in a suitable mold and vulcanized 45 minutes at 287° F. As a control an identical masterbatch is prepared and subjected to all the previously described manipulative steps except that no benzotrichloride is added to the mixture. The specific electrical resistivity and torsional hysteresis are measured, with the following results:

| | Mooney Viscosity [1] | Log. Res. | Tors. Hyst., 280° F. |
|---|---|---|---|
| Control | 35 | 7.4 | 0.119 |
| Sample with benzotrichloride | 23 | 11.5 | 0.088 |

[1] (ML–4 at 212° F.).

Thus, the practice of the invention has increased the specific resistivity by over 10,000 times, and has decreased the torsional hysteresis by over 25%.

In the absence of a chemical promoter, at least 30 minutes at 325° F. would be required to obtain this reduction of torsional hysteresis.

The above described high temperature mastication and and mixing steps may be conveniently carried out in a Banbury mixer instead of on an open rubber mill.

EXAMPLE 2

An experiment is carried out in a manner identical with Example 1, except that 2.0 parts of benzotrichloride and 2.4 parts of lead dioxide are mixed into the masterbatch prior to mastication at 300 F. As a control, an identical experiment is carried out in which 2.4 parts lead dioxide, but no benzotrichloride, is added to the masterbatch prior to the mastication at 300° F. After vulcanization, the samples showed the following specific resistivity and torsional hysteresis:

| | Mooney Viscosity [1] | Log. Res. | Tors. Hyst., 280° F. |
|---|---|---|---|
| Sample with benzotrichloride and lead dioxide | 18 | >13.0 | 0.068 |
| Sample with lead dioxide | 30 | 7.4 | 0.122 |

[1] (ML–4 at 212° F.).

These data show that although lead dioxide is inert in the process by itself, it increases the efficiency of benzotrichloride in promoting low-hysteresis processing.

EXAMPLE 3

Several halogenated aryl methyl compounds were tested, some in the presence of lead dioxide, in the manner of Example 1. The results are shown in Table I.

Table 1

| Chemical | Parts [a] | Parts PbO$_2$ | Log. Res. | Tors. Hyst., 280° F. | Mooney Viscosity [b] |
|---|---|---|---|---|---|
| 1. o-Chlorobenzotrichloride | 2.3 | -------- | 9.2 | 0.099 | 34 |
| 2. o-Chlorobenzotrichloride | 2.3 | 1.2 | >13.0 | .074 | 23 |
| 3. o-Chlorobenzotrichloride | 2.3 | 2.4 | >13.0 | .054 | 19 |
| 4. Control (1, 2, 3) | -------- | -------- | 7.7 | .119 | 40 |
| 5. o-Chlorobenzotrichloride | 2.3 | -------- | 11.4 | .084 | 36 |
| 6. p-Chlorobenzotrichloride | 2.3 | -------- | 12.0 | .094 | 31 |
| 7. p-Chlorobenzotrichloride | 2.3 | 2.4 | >13.0 | .067 | 22 |
| 8. p-Nitrobenzal bromide | 3.0 | -------- | >13.0 | .101 | 33 |
| 9. Control (5, 6, 7, 8) | -------- | -------- | 8.2 | .110 | 46 |
| 10. 2,4-Dichlorobenzotrichloride | 2.7 | -------- | 12.2 | .080 | 28 |
| 11. Benzyl bromide | 1.7 | -------- | 7.5 | .150 | 46 |
| 12. p-Nitrobenzyl chloride | 1.7 | -------- | 7.6 | .151 | 41 |
| 13. p-Nitrobenzyl bromide | 2.2 | -------- | 8.4 | .210 | 44 |
| 14. Control (10, 11, 12, 13) | -------- | -------- | 7.9 | .121 | 47 |
| 15. Benzal chloride | 1.6 | -------- | 9.1 | .100 | 39 |
| 16. Control (15) | -------- | -------- | 8.4 | .107 | 46 |

[a] Equimolar amounts.
[b] ML-4 at 212° F.

These results show that the aryl trichloromethyl compounds are the most effective in reducing torsional hysteresis and increasing the specific electrical resistivity. They are activated by lead dioxide. p-Nitrobenzal bromide (Stock 8) has a large effect on specific electrical resistivity but a relatively small effect on torsional hysteresis. These chemicals reduce the Mooney viscosity of the uncured stocks. These chemicals (Stocks 11, 12 and 13) with only one halogen atom on the methyl group showed no advantage over the control. Benzal chloride (Stock 14) which has only two chlorine atoms on the methyl group was not as effective as the chemicals having two bromine or three chlorine atoms on the methyl group attached to the benzene ring.

EXAMPLE 4

A masterbatch is prepared by mixing together 70 parts of a butadiene-styrene copolymer (known as GR-S, polymerized at 41° F.), 30 parts of natural Hevea rubber, 55 parts of "Spheron #6" carbon black, 5 parts of hydrocarbon softener, and 2 parts of stearic acid. This mixing operation is carried out in a conventional manner in a Banbury mixer or two-roll rubber mill. To 162 parts of this masterbatch is added 2.5 parts of benzotrichloride at a temperature preferably below 275° F. The mixture is masticated in a Banbury mixer for eight minutes at 325° F. The stock is then admixed with 3 parts of zinc oxide, 0.65 part of 2-mercaptobenzothiazole, 0.25 part of diphenylguanidine, and 1.8 parts of sulfur, and vulcanized 60 minutes at 293° F. A control stock is prepared in an identical manner, except that no benzotrichloride is used, and 2.2 parts of sulfur is used in place of 1.8 parts. Electrical resistivity and torsional hysteresis are measured.

| | Log. Res. | Tors. Hyst., 280° F. |
|---|---|---|
| Control | 7.8 | 0.152 |
| Stock with benzotrichloride | 10.6 | .102 |

The practice of the invention has increased the specific electrical resistivity by a factor of nearly 1000, and has reduced the torsional hysteresis by over 30%.

EXAMPLE 5

A masterbatch of an isobutylene-isoprene copolymer (known as "Butyl-25") containing 50 parts of "Spheron #6" carbon black and 2.0 parts of benzotrichloride is milled in a laboratory Banbury mixer for 20 minutes at 375° F. A control is treated in the same manner except that no benzotrichloride is used. The stocks are vulcanized with 5 parts of zinc oxide, 1 part of stearic acid, 1 part of tetramethylthiuram disulfide, 2 parts of sulfur, and 0.5 part of 2-mercaptobenzothiazole (60 minutes at 293° F.). The results are given below:

| | Mooney Viscosity ML-4 | Log. Res. | Tors. Hyst., 280° F. |
|---|---|---|---|
| Control | 61 | 5.7 | 0.212 |
| Sample with benzotrichloride | 51 | 9.3 | .137 |

The practice of the invention has increased the specific electrical resistivity by a factor of about 7800, and decreased the torsional hysteresis by 35%.

EXAMPLE 6

This example shows that p-nitrobenzal bromide is a very effective promoter in Butyl rubber and carbon black mixtures.

A masterbatch containing 100 parts of an isobutylene-isoprene copolymer (known commercially as Butyl-15), 50 parts of "Spheron #6," and 1.5 parts of n-nitrobenzal bromide is masticated for 15 minutes at 375° F. A control has the same treatment, except that no promoter is used. The stocks are vulcanized as in Example 5. The results are given below:

| | ML-4 | Log. Res. | Tors. Hyst., 280° F. |
|---|---|---|---|
| Control | 64 | 6.8 | 0.156 |
| Sample with p-nitrobenzal bromide | 63 | >13.0 | .070 |

Specific electrical resistivity is increased by a factor of over 1,000,000 and torsional hysteresis is reduced by 55%.

Although I have disclosed my invention with particular emphasis upon the preferred practice wherein the heat treatment is accompanied with mastication, nevertheless my invention can be practiced by carrying out the heat treatment under static conditions. For example, I may intimately mix the rubber, carbon black, aryl polyhalogenomethane, and metal oxide if desired, in any suitable manner and then heat this mixture at 275°–400° F. without simultaneously masticating it, the heat-treated mixture being subsequently masticated and compounded with conventional compounding and vulcanizing ingredients followed by shaping and vulcanizing in the usual way. The static heat-treatment can be conducted by placing slabs of the stock in an oven heated to a suitable temperature, or slabs of hot stock can be stacked up and allowed to stand for several hours, preferably under relatively non-heat-conductive conditions, in order to maintain the mixture at the temperature of 275°–400° F. for as long as reasonably possible. If desired, the slabs can be wrapped with a suitable insulating blanket to cause prolonged retention of heat. Such static heat treatment has the advantage of releasing the Banbury equipment from use for carrying out the heat treatment and this may be desirable under certain conditions.

The electrical resistivity values given in the above examples were determined by measuring the resistance of a specimen of known thickness (about 0.1 inch) placed between mercury electrodes, under a potential difference of 135 volts, using a sensitive galvanometer with an Ayrton shunt. The logarithm (to base 10) of the specific electrical resistivity (expressed in ohm-cms.) is designated "Log resistivity."

The torsional hysteresis figures represent the logarithmic decrement (to base 10) of the observed amplitudes of successive oscillations of a torsion pendulum, measured at 280° F. with an apparatus consisting essentially of a torsion pendulum in which the sample of rubber tested supplies the restoring force when the pendulum is deflected. For further description of this test see Gerke et al., 2,118,601.

Having thus described my invention, what I claim and desire to protect by Letters Patent is:

1. A process which comprises mixing rubber selected from the group consisting of natural rubber, synthetic rubbery homopolymers of aliphatic conjugated diolefin hydrocarbons and synthetic rubbery copolymers of such diolefin hydrocarbons with copolymerizable monoolefinic compounds with a relatively large amount of rubber-reinforcing carbon black and an aryl polyhalogenomethane selected from the group consisting of $RCX_nY_{3-n}$ ($n$ is an integer from 0–3, X is chlorine, Y is bromine), and $RCHBr_2$ where R is selected from the group consisting of phenyl radical, 2-pyridyl radical, and substituted phenyl, naphthyl, and 2-pyridyl radicals in which the substituent is selected from the group consisting of nitro, carboxyl, carbalkoxy, and halogen, the amount of said polyhalogenomethane being equal to from 1 to 4 parts per 100 parts of said rubber, heating the mixture at a temperature above 275° F. but below that at which the rubber would be harmed, masticating the mixture and thereafter completing incorporation of vulcanizing and other desired ingredients, shaping the resulting mass, and vulcanizing the resulting shaped mass.

2. A process which comprises mixing rubber selected from the group consisting of natural rubber, synthetic rubber homopolymers of aliphatic conjugated diolefin hydrocarbons and synthetic rubbery copolymers of such diolefin hydrocarbons with copolymerizable monoolefinic compounds with a relatively large amount of rubber-reinforcing carbon black and an aryl polyhalogenomethane selected from the group consisting of $RCX_nY_{3-n}$ ($n$ is an integer from 0–3, X is chlorine, Y is bromine) and $RCHBr_2$ where R is selected from the group consisting of phenyl radical, 2-pyridyl radical, and substituted phenyl, naphthyl, and 2-pyridyl radicals in which the substituent is selected from the group consisting of nitro, carboxyl, carbalkoxy, and halogen, the amount of said polyhalogenomethane being equal to from 1 to 4 parts per 100 parts of said rubber, masticating the mixture at a temperature above 275° F. but not over 400° F., thereafter incorporating vulcanizing and other desired ingredients, shaping the mass, and vulcanizing the resulting shaped mass.

3. A process which comprises mixing rubber selected from the group consisting of natural rubber, synthetic rubbery homopolymers of aliphatic conjugated diolefin hydrocarbons and synthetic rubbery copolymers of such diolefin hydrocarbons with copolymerizable monoolefinic compounds with a relatively large amount of rubber-reinforcing carbon black and benzotrichloride in amount equal to from 1 to 4 parts per 100 parts of said rubber, heating the mixture at a temperature above 275° F. but below that at which the rubber would be harmed, masticating the mixture and thereafter completing incorporation of vulcanizing and other desired ingredients, shaping the mass, and vulcanizing the resulting shaped mass.

4. A process which comprises mixing rubber comprising Hevea rubber with a relatively large amount of rubber-reinforcing carbon black and benzotrichloride in amount equal to from 1 to 4 parts per 100 parts of said rubber, heating the mixture at a temperature above 275° F. but below that at which the rubber would be harmed, masticating the mixture and thereafter completing incorporation of vulcanizing and other desired ingredients, shaping the mass, and vulcanizing the resulting shaped mass.

5. A process which comprises mixing rubber selected from the group consisting of natural rubber, synthetic rubbery homopolymers of aliphatic conjugated diolefin hydrocarbons and synthetic rubbery copolymers of such diolefin hydrocarbons with copolymerizable monoolefinic compounds with a relatively large amount of rubber-reinforcing carbon black, benzotrichloride in amount equal to from 1 to 4 parts per 100 parts of said rubber, and lead dioxide in amount equal to from 1 to 5 parts per 100 parts of said rubber, heating the mixture at a temperature above 275° F. but below that at which the rubber would be harmed, masticating the mixture and thereafter completing incorporation of vulcanizing and other desired ingredients, shaping the mass, and vulcanizing the resulting shaped mass.

6. A process which comprises mixing rubber selected from the group consisting of natural rubber, synthetic rubbery homopolymers of aliphatic conjugated diolefin hydrocarbons and synthetic rubbery copolymers of such diolefin hydrocarbons with copolymerizable monoolefinic compounds with a relatively large amount of rubber-reinforcing carbon black and a monochlorobenzotrichloride in amount equal to from 1 to 4 parts per 100 parts of said rubber, heating the mixture at a temperature above 275° F. but below that at which the rubber would be harmed, masticating the mixture and thereafter completing incorporation of vulcanizing and other desired ingredients, shaping the mass, and vulcanizing the resulting shaped mass.

7. A process which comprises mixing rubber selected from the group consisting of natural rubber, synthetic rubbery homopolymers of aliphatic conjugated diolefin hydrocarbons and synthetic rubbery copolymers of such diolefin hydrocarbons with copolymerizable monoolefinic compounds with a relatively large amount of rubber-reinforcing carbon black, a monochlorobenzotrichloride in amount equal to from 1 to 4 parts per 100 parts of said rubber, and lead dioxide in amount equal to from 1 to 5 parts per 100 parts of said rubber, heating the mixture at a temperature above 275° F. but below that at which the rubber would be harmed, masticating the mixture and thereafter completing incorporation of vulcanizing and other desired ingredients, shaping the mass, and vulcanizing the resulting shaped mass.

8. A process which comprises mixing rubber selected from the group consisting of natural rubber, synthetic rubbery homopolymers of aliphatic conjugated diolefin hydrocarbons and synthetic rubbery copolymers of such diolefin hydrocarbons with copolymerizable monoolefinic compounds with a relatively large amount of rubber-reinforcing carbon black and a dichlorobenzotrichloride in amount equal to from 1 to 4 parts per 100 parts of said rubber, heating the mixture at a temperature above 275° F. but below that at which the rubber would be harmed, masticating the mixture and thereafter completing incorporation of vulcanizing and other desired ingredients, shaping the mass, and vulcanizing the resulting shaped mass.

9. A process which comprises mixing a blend of Hevea rubber with butadiene-styrene rubbery copolymer, which blend contains at least 25% of Hevea rubber, with a relatively large amount of rubber-reinforcing carbon black and with from 1 to 4 parts per 100 parts of said blend of benzotrichloride, heating the mixture at a temperature above 275° F. but below that at which the rubber would be harmed, masticating the mixture and thereafter completing incorporation of vulcanizing and other desired ingredients, shaping the mass, and vulcanizing the resulting shaped mass.

10. A process as set forth in claim 9 wherein the mixture subjected to heat treatment also comprises from 1 to 5 parts of lead dioxide per 100 parts of said rubber.

11. A process which comprises mixing a rubbery copolymer of a major proportion of isobutylene and a minor proportion of an aliphatic conjugated diolefin hydrocarbon with a relatively large amount of rubber-reinforcing carbon black and p-nitrobenzal bromide in amount equal to from 1 to 4 parts per 100 parts of said copolymer, heating the mixture at a temperature above 275° F. but below that at which said copolymer would be harmed, masticating the mixture and thereafter completing incorporation of vulcanizing and other desired ingredients, shaping the mass, and vulcanizing the resulting shaped mass.

12. A process as set forth in claim 8 wherein the mixture subjected to heat treatment also comprises from 1 to 5 parts of lead dioxide per 100 parts of said rubber.

References Cited in the file of this patent

UNITED STATES PATENTS

| | | | |
|---|---|---|---|
| 2,118,601 | Gerke et al. | | May 24, 1938 |
| 2,489,340 | Sturgis et al. | | Nov. 29, 1949 |
| 2,567,135 | Sturgis et al. | | Sept. 4, 1951 |
| 2,658,092 | Barton | | Nov. 3, 1953 |
| 2,689,842 | Barton | | Sept. 21, 1954 |
| 2,710,287 | Barton et al. | | June 7, 1955 |
| 2,720,499 | Doak | | Oct. 11, 1955 |
| 2,734,885 | Doak | | Feb. 14, 1956 |
| 2,734,887 | Doak et al. | | Feb. 14, 1956 |